United States Patent
Nakata

(10) Patent No.: US 11,057,411 B2
(45) Date of Patent: Jul. 6, 2021

(54) LOG ANALYSIS DEVICE, LOG ANALYSIS METHOD, AND LOG ANALYSIS PROGRAM

(71) Applicant: NIPPON TELEGRAPH AND TELEPHONE CORPORATION, Chiyoda-ku (JP)

(72) Inventor: Kensuke Nakata, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 282 days.

(21) Appl. No.: 16/311,040

(22) PCT Filed: Jun. 7, 2017

(86) PCT No.: PCT/JP2017/021167
§ 371 (c)(1),
(2) Date: Dec. 18, 2018

(87) PCT Pub. No.: WO2017/221711
PCT Pub. Date: Dec. 28, 2017

(65) Prior Publication Data
US 2019/0182283 A1    Jun. 13, 2019

(30) Foreign Application Priority Data
Jun. 23, 2016   (JP) .............. JP2016-124554

(51) Int. Cl.
*H04L 29/06* (2006.01)
*G06F 21/55* (2013.01)
*G06F 21/56* (2013.01)

(52) U.S. Cl.
CPC .......... *H04L 63/1425* (2013.01); *G06F 21/55* (2013.01); *G06F 21/567* (2013.01); *G06F 2221/034* (2013.01)

(58) Field of Classification Search
CPC ............. H04L 63/1425; H04L 63/1416; H04L 63/1433; H04L 63/145; G06F 21/55; G06F 21/56; G06F 21/567; G06F 2221/034
See application file for complete search history.

(56) References Cited

U.S. PATENT DOCUMENTS

| | | | |
|---|---|---|---|
| 5,511,163 A * | 4/1996 | Lerche ................ | G06F 21/564 714/28 |
| 7,490,149 B2 * | 2/2009 | Omote ................ | H04L 29/06 709/222 |

(Continued)

FOREIGN PATENT DOCUMENTS

WO    WO 2015/141630 A1    9/2015

OTHER PUBLICATIONS

International Search Report dated Sep. 12, 2017 in PCT/JP2017/021167 filed on Jun. 7, 2017.

(Continued)

*Primary Examiner* — Hosuk Song
(74) *Attorney, Agent, or Firm* — Oblon, McClelland, Maier & Neustadt, L.L.P.

(57) ABSTRACT

A log acquirer acquires a communication log to be analyzed obtained from communications in a predetermined network. A log analyzer detects a terminal conforming to an analysis rule using a signature generated based on the characteristics of a communication log generated by a terminal infected with malware. A primary scorer and a secondary scorer calculate a score indicating the degree of threat for a detection result including the information on the terminal detected by the log analyzer and an analysis rule to which the terminal conforms using the information on the analysis rule and the information on the detection result. A detection (Continued)

result display unit outputs the detection result and the score calculated by the primary scorer and the secondary scorer.

8 Claims, 8 Drawing Sheets

(56) References Cited

U.S. PATENT DOCUMENTS

| | | | | |
|---|---|---|---|---|
| 7,496,961 | B2* | 2/2009 | Zimmer | G06F 21/554 |
| | | | | 713/188 |
| 7,890,612 | B2* | 2/2011 | Todd | H04L 63/1483 |
| | | | | 709/220 |
| 8,191,139 | B2* | 5/2012 | Heimerdinger | H04L 63/1416 |
| | | | | 726/23 |
| 8,220,048 | B2* | 7/2012 | Rubin | H04L 63/1425 |
| | | | | 726/22 |
| 9,553,890 | B2* | 1/2017 | Wang | H04L 63/1416 |
| 9,602,527 | B2* | 3/2017 | Yu | H04L 63/1425 |
| 9,838,420 | B2* | 12/2017 | Prokudin | G06F 21/552 |
| 2015/0128274 | A1* | 5/2015 | Giokas | H04L 63/1425 |
| | | | | 726/23 |
| 2017/0013018 | A1 | 1/2017 | Nakata et al. | |

OTHER PUBLICATIONS

Nakata, K., "Anomaly Communication Detection Method by Analyzing Network Logs", the Institute of Electronics, Information and Communication Engineers, General Conference, 2013, 3 pages (with English translation).

Nakata, K. et al., "A Method of Extracting Common Malware Communication Patterns from Dynamic Analysis Result ", CSS2015 Computer Security Symposium, Ronbunshu Godo Kaisai Anti-Malware Engineering Workshop 2015, Privacy Workshop, 2015 IPSJ Symposium Series, vol. 2015, No. 3 [CD-ROM ], Oct. 14, 2015, pp. 318-325 (with English translation), 34 total pages.

Mishina, T. et al., "Discussion on Threat Scenario to Design SIEM System for IoT (IoT Muke SIEM System Sekkei no Tameno Kyoi Scenerio Kenton)", IEICE Technical Report, vol. 116, No. 65, May 19, 2016, pp. 33-38 (with English translation), 26 total pages.

* cited by examiner

FIG.2

| ITEM NUMBER | ITEM NAME | REMARKS |
|---|---|---|
| 1 | TIME STAMP | TIME WHEN COMMUNICATION LOG IS ACQUIRED |
| 2 | LogSource | ID UNIQUE TO DEVICE THAT RECORDS COMMUNICATION LOG |
| 3 | SOURCE IP ADDRESS | INFORMATION ON SOURCE IP ADDRESS OF COMMUNICATIONS |
| 4 | SOURCE PORT NUMBER | SOURCE PORT NUMBER OF COMMUNICATIONS |
| 5 | DESTINATION IP ADDRESS | DESTINATION IP ADDRESS OF COMMUNICATIONS |
| 6 | DESTINATION PORT NUMBER | DESTINATION PORT NUMBER OF COMMUNICATIONS |
| 7 | COMMUNICATION PROTOCOL NAME | COMMUNICATION PROTOCOL NAME OF COMMUNICATIONS |
| 8 | DETERMINATION RESULT | DETERMINATION RESULT IN DEVICE THAT PERFORMS COMMUNICATIONS |
| 9 | NUMBER OF TRANSMITTED BYTES | NUMBER OF TRANSMITTED BYTES IN COMMUNICATIONS |
| 10 | NUMBER OF RECEIVED BYTES | NUMBER OF RECEIVED BYTES IN COMMUNICATIONS |
| 11 | URL | DESTINATION URL OBTAINED WHEN COMMUNICATIONS ARE HTTP COMMUNICATIONS |
| 12 | METHOD NAME | HTTP METHOD NAME OBTAINED WHEN COMMUNICATIONS ARE HTTP COMMUNICATIONS |
| 13 | UserAgent | HTTP USER AGENT NAME OBTAINED WHEN COMMUNICATIONS ARE HTTP COMMUNICATIONS |
| 14 | STATUS CODE | HTTP STATUS CODE OBTAINED WHEN COMMUNICATIONS ARE HTTP COMMUNICATIONS |
| 15 | DURATION | SESSION DURATION IN COMMUNICATIONS |
| 16 | COMMUNICATION DIRECTION | COMMUNICATION DIRECTION IN COMMUNICATIONS |

FIG.3

| ANALYSIS RULE | FIELD | VALUE | THRESHOLD | DEGREE OF THREAT | DETECTION CONDITION |
|---|---|---|---|---|---|
| Rule-1 | URL | http://www.malsite.com/ | 1 | 8 | DETECT TERMINAL FOR WHICH COMMUNICATION LOG INCLUDING URL IS RECORDED ONE OR MORE TIMES |
| Rule-2 | PROTOCOL + DESTINATION PORT | TCP/4092 | 10 | 2 | DETECT TERMINAL FOR WHICH COMMUNICATION LOG INCLUDING VALUE IS RECORDED TEN OR MORE TIMES |
| Rule-3 | DESTINATION ORGANIZATION | Malware.com | 1 | 7 | DETECT TERMINAL FOR WHICH COMMUNICATION LOG INCLUDING ORGANIZATION IS RECORDED ONE OR MORE TIMES |
| Rule-4 | UserAgent | badAgent | 5 | 3 | DETECT TERMINAL FOR WHICH COMMUNICATION LOG INCLUDING UserAgent IS RECORDED FIVE OR MORE TIMES |
| Rule-5 | DESTINATION IP ADDRESS | 10.10.10.10 | 5 | 8 | DETECT TERMINAL FOR WHICH COMMUNICATION LOG INCLUDING DESTINATION IP ADDRESS IS RECORDED FIVE OR MORE TIMES |

FIG.4

| No. | TERMINAL | ANALYSIS RULE | THRESHOLD | COUNT NUMBER | BASIC SCORE | INFORMATION ON RELATING LOG |
|---|---|---|---|---|---|---|
| 1 | 192.168.10.10 | Rule-1 | 1 | 1 | 8 | Log1 |
| 2 | 192.168.20.20 | Rule-2 | 10 | 20 | 2 | Log101-120 |
| 3 | 192.168.30.30 | Rule-3 | 1 | 1 | 7 | Log300 |
| 4 | 192.168.40.40 | Rule-1 | 1 | 5 | 8 | Log401-405 |
| 5 | 192.168.50.50 | Rule-2 | 10 | 50 | 2 | Log501-550 |

FIG.5

| No. | TERMINAL | ANALYSIS RULE | THRESHOLD | COUNT NUMBER | PRIMARY SCORE | EXCLUSION FLAG |
|---|---|---|---|---|---|---|
| 1 | 192.168.10.10 | Rule-1 | 1 | 1 | 8 | |
| 2 | 192.168.20.20 | Rule-2 | 10 | 20 | 4 | |
| 3 | 192.168.30.30 | Rule-3 | 1 | 1 | - | ○ |
| 4 | 192.168.40.40 | Rule-1 | 1 | 5 | 40 | |
| 5 | 192.168.50.50 | Rule-2 | 10 | 50 | 10 | |

FIG.6

| No. | TERMINAL | ANALYSIS RULE | THRESHOLD | COUNT NUMBER | SECOND-ARY SCORE | EXCLUSION FLAG |
|---|---|---|---|---|---|---|
| 1 | 192.168.10.10 | Rule-1 | 1 | 1 | 58 | |
| 2 | 192.168.20.20 | Rule-2 | 10 | 20 | 4 | |
| 3 | 192.168.30.30 | Rule-3 | 1 | 1 | - | ○ |
| 4 | 192.168.40.40 | Rule-1 | 1 | 5 | 42 | |
| 5 | 192.168.50.50 | Rule-2 | 10 | 50 | 15 | |

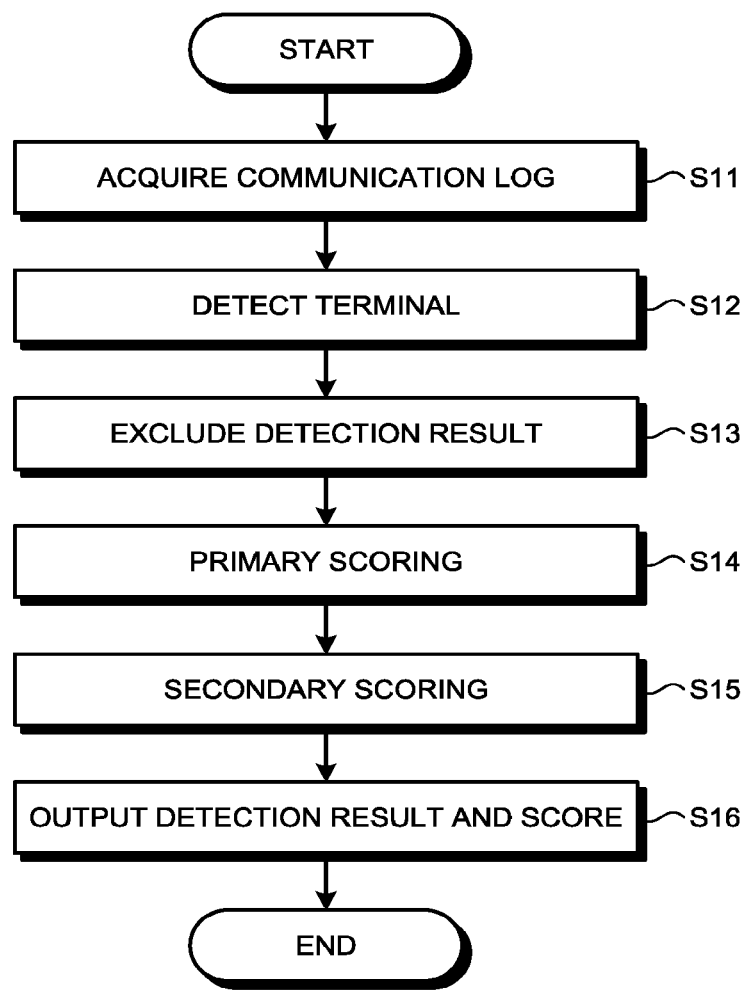

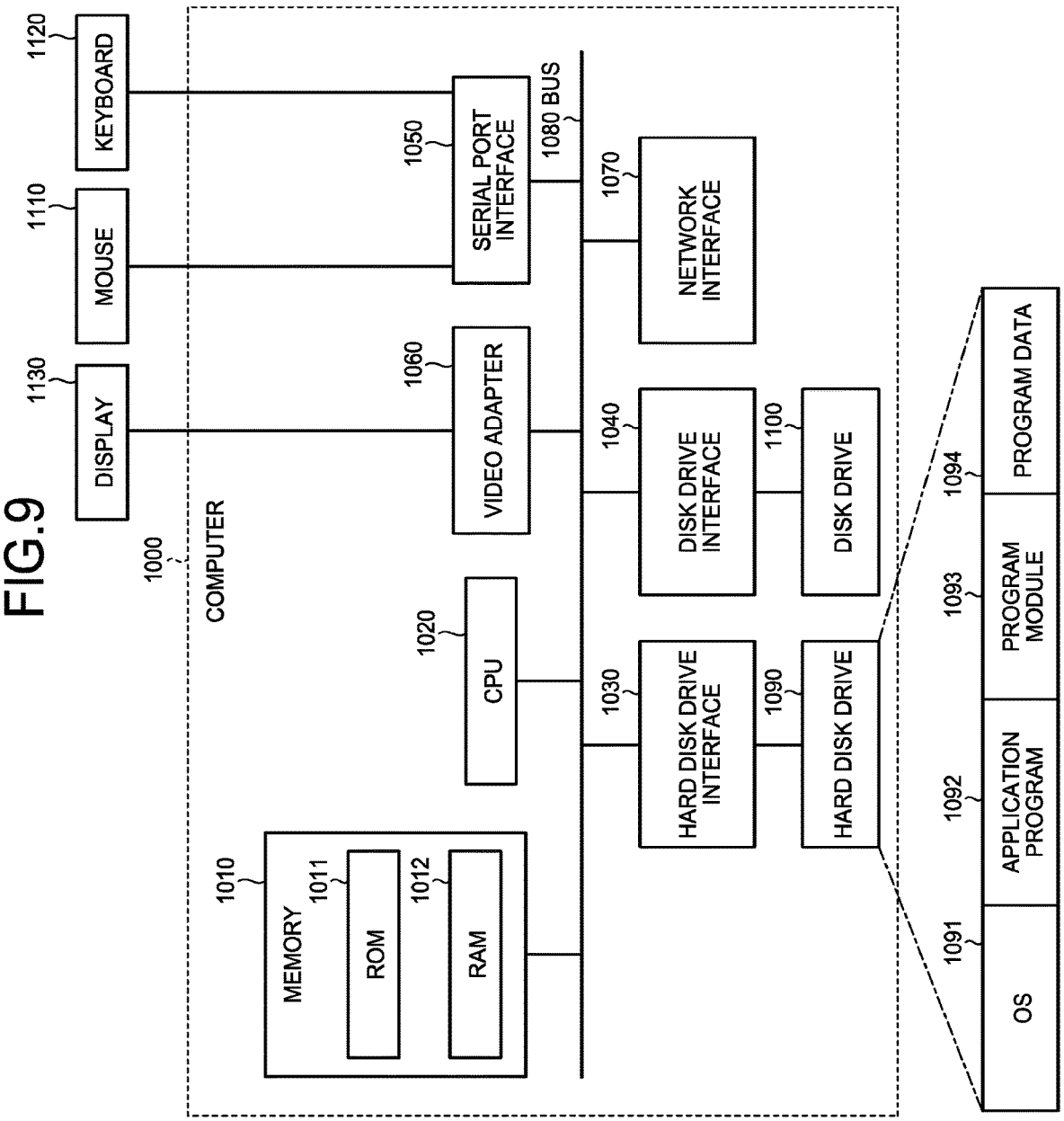

LOG ANALYSIS DEVICE, LOG ANALYSIS METHOD, AND LOG ANALYSIS PROGRAM

FIELD

The present invention relates to a log analysis device, a log analysis method, and a log analysis program.

BACKGROUND

Cyberattacks on various services and infrastructures via networks are now becoming more persistent using a great variety of methods, and their threat is increasing. It is, however, difficult to prevent infection completely. To address this, widely known are infected terminal detection techniques for finding and disinfecting an infected terminal at an early stage by using a SIEM (security information and event management) product, collecting logs from various security appliances and network devices, and performing an analysis.

Various infected terminal detection techniques are known, including the following technique: using a security appliance, such as FireWall and IDS (intrusion detection system)/IPS (intrusion prevention system), to monitor a communication log at an entrance and exit of a network to be protected and detecting the communications as an attack or abnormal communications if the communication log of the monitored communications does not satisfy a signature or a predetermined profile (refer to Non Patent Literature 1, for example)

CITATION LIST

Non Patent Literature

Non Patent Literature 1: Kensuke Nakata, "A Method of Detecting Malicious Communications by Network Log Analyses," the Institute of Electronics, Information and Communication Engineers, General Conference 2013

SUMMARY

Technical Problem

The conventional technique, however, has a problem in that it is difficult for an operator to determine which detection result should be preferentially dealt with if a plurality of detection results are present.

Solution to Problem

To solve a problem and to achieve an object, a log analysis device includes: a log acquirer configured to acquire a communication log to be analyzed obtained from communications in a predetermined network; a detector configured to detect a terminal conforming to an analysis rule using a signature generated based on a characteristic of a communication log generated by a terminal infected with malware; a calculator configured to calculate a score indicating a degree of threat for a detection result including information on the terminal detected by the detector and an analysis rule to which the terminal conforms using information on the analysis rule and information on the detection result; and an output unit configured to output the detection result and the score calculated by the calculator.

To solve a problem and to achieve an object, a log analysis method performed by a log analysis device, the log analysis method includes: a step of acquiring a communication log to be analyzed obtained from communications in a predetermined network; a step of detecting a terminal conforming to an analysis rule using a signature generated based on a characteristic of a communication log generated by a terminal infected with malware; a step of calculating a score indicating a degree of threat for a detection result including information on the terminal detected at the step of detecting and an analysis rule to which the terminal conforms using information on the analysis rule and information on the detection result; and a step of outputting the detection result and the score calculated at the step of calculating.

Advantageous Effects of Invention

The present invention enables an operator to readily determine which detection result should be preferentially dealt with if a plurality of detection results are present.

BRIEF DESCRIPTION OF DRAWINGS

FIG. 2 is a diagram of an example of fields of a communication log.

FIG. 3 is a diagram of an example of analysis rules.

FIG. 4 is a diagram of an example of detection results.

FIG. 5 is a diagram of an example of primary detection results.

FIG. 6 is a diagram of an example of secondary detection results.

FIG. 8 is a flowchart of a processing procedure performed by a log analysis device according to the first embodiment.

FIG. 9 is a diagram of an example of a computer serving as the log analysis device by executing a program.

DESCRIPTION OF EMBODIMENTS

Exemplary embodiments of a log analysis device, a log analysis method, and a log analysis program according to the present application are described below in greater detail with reference to the accompanying drawings. The embodiments are not intended to limit the present invention.

Configuration of the First Embodiment

Figure 1:
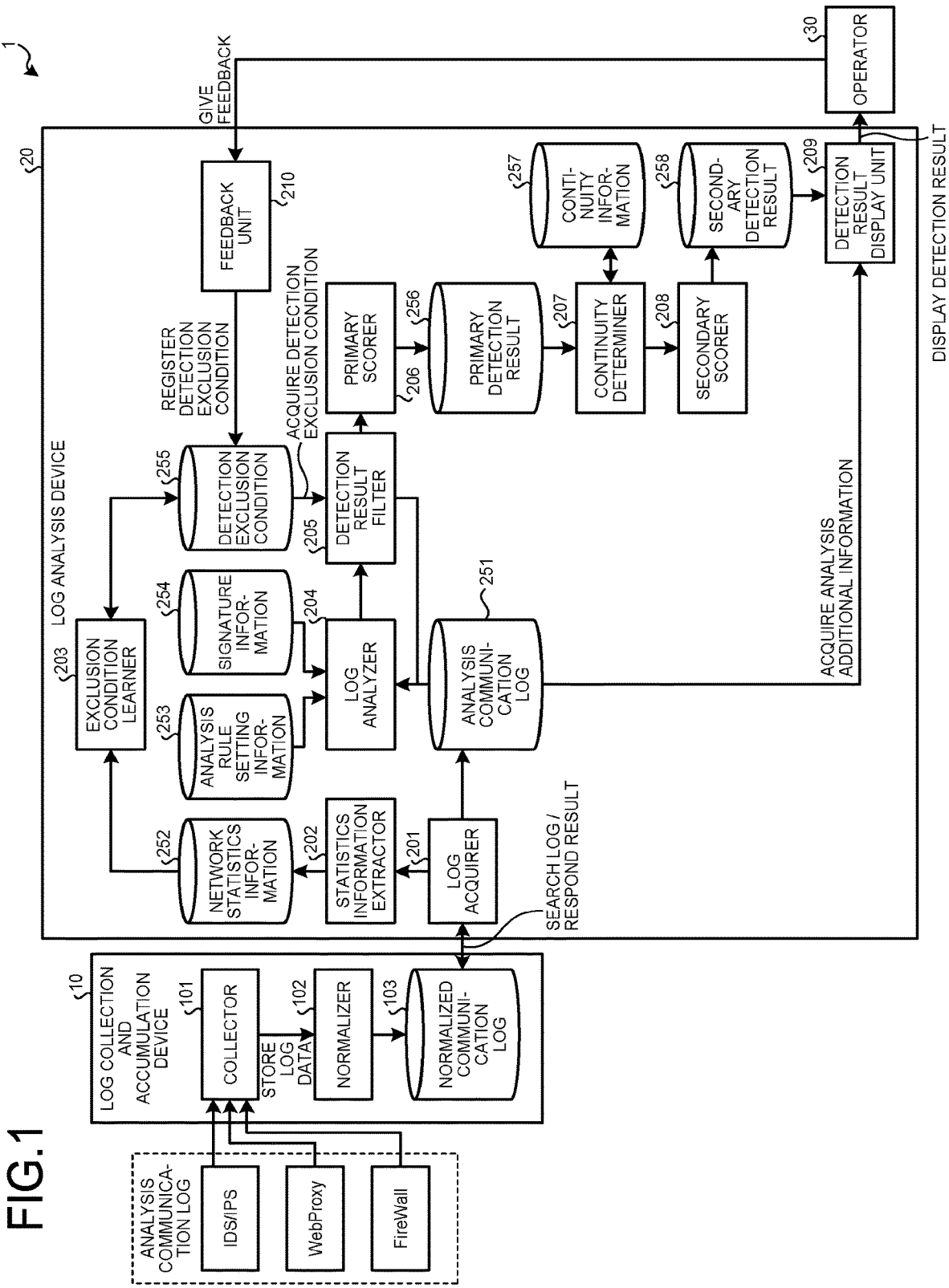
FIG. 1 is a diagram of an example of the configuration of a log analysis system according to a first embodiment.

The configuration of a log analysis system according to a first embodiment is described with reference to FIG. 1. FIG. 1 is a diagram of an example of the configuration of the log analysis system according to the first embodiment. As illustrated in FIG. 1, a log analysis system 1 includes a log collection and accumulation device 10 and a log analysis device 20.

The log collection and accumulation device 10 and the log analysis device 20 are coupled via any desired kind of communication network, such as a wired or wireless LAN (local area network) and VPN (virtual private network). The number of log analysis devices 20 included in the log analysis system 1 is not limited to the number illustrated in the drawing and may be any desired number. The log collection and accumulation device 10 and the log analysis device 20 each include a communication unit, a controller, and a storage unit, which are not illustrated.

The communication unit performs data communications with other devices via a network. The communication unit is an NIC (network interface card), for example. The controller controls the whole device. The controller is an electronic circuit, such as a CPU (central processing unit) and an MPU (micro processing unit), or an integrated circuit, such as an ASIC (application specific integrated circuit) and an FPGA (field programmable gate array). The controller includes an internal memory that stores therein programs defining various processing procedures and control data. The controller performs the processing using the internal memory. The controller executing the various programs, thereby providing the processing units.

The storage unit is a storage device, such as an HDD (hard disk drive), an SSD (solid state drive), and an optical disc. The storage unit may be a data-rewritable semiconductor memory, such as a RAM (random access memory), a flash memory, and an NVSRAM (non-volatile static random access memory). The storage unit stores therein an OS (operating system) and various programs executed by the device. The storage unit also stores therein various kinds of information used in execution of the programs.

The controller executes the programs, for example, thereby providing a log acquirer 201, a statistics information extractor 202, an exclusion condition learner 203, a log analyzer 204, a detection result filter 205, a primary scorer 206, a continuity determiner 207, a secondary scorer 208, and a detection result display unit 209, which will be described later. The storage unit, for example, stores therein an analysis communication log 251, network statistics information 252, analysis rule setting information 253, signature information 254, a detection exclusion condition 255, a primary detection result 256, continuity information 257, and a secondary detection result 258, which will be described later.

The following describes the devices in the log analysis system 1. The log collection and accumulation device 10 collects and accumulates communication logs to be analyzed. As illustrated in FIG. 1, the log collection and accumulation device 10 includes a collector 101 and a normalizer 102 and stores therein a normalized communication log 103.

The collector 101 acquires a communication log to be analyzed from IDS/IPS, WebProxy, FireWall, or the like. The communication log to be analyzed is a communication log generated by a terminal on which whether it is infected with malware has not been determined yet, for example. The normalizer 102 normalizes a communication log. A communication log may possibly have different formats depending on devices that record the communication log. The normalizer 102 extracts predetermined fields and values from a communication log to be analyzed, thereby normalizing the communication log. The log collection and accumulation device 10 stores therein the normalized communication log as the normalized communication log 103.

The following describes the fields and the values of a communication log with reference to FIG. 2. FIG. 2 is a diagram of an example of the fields of a communication log. The normalizer 102, for example, extracts the fields and the values illustrated in FIG. 2 from a communication log as the normalized communication log 103.

As illustrated in FIG. 2, the fields of a communication log include a time stamp, LogSource, a source IP address, a source port number, a destination IP address, a destination port number, a communication protocol name, a determination result, the number of transmitted bytes, the number of received bytes, a URL, a method name, UserAgent, a status code, duration, and a communication direction, for example.

The value of the field "time stamp" indicates time when a communication log is acquired. The value of the field "LogSource" indicates an ID unique to a device that records the communication log. The value of the field "source IP address" indicates information on a source IP address of the communications. The value of the field "source port number" indicates a source port number of the communications. The value of the field "destination IP address" indicates a destination IP address of the communications. The value of the field "destination port number" indicates a destination port number of the communications. The value of the field "communication protocol name" indicates a communication protocol name of the communications. The value of the field "determination result" indicates a determination result in the device that performs the communications. The value of the field "number of transmitted bytes" indicates the number of transmitted bytes in the communications. The value of the field "number of received bytes" indicates the number of received bytes in the communications. The value of the field "URL" indicates a destination URL obtained when the communications are HTTP communications. The value of the field "method name" indicates an HTTP method name obtained when the communications are HTTP communications. The value of the field "UserAgent" indicates an HTTP user agent name obtained when the communications are HTTP communications. The value of the field "status code" indicates an HTTP status code obtained when the communications are HTTP communications. The value of the field "duration" indicates session duration in the communications. The value of the field "communication direction" indicates a communication direction in the communications.

The log analysis device 20 analyzes a communication log and displays an analysis result and information on malware serving as a generation source of a signature used in the analysis. As illustrated in FIG. 1, the log analysis device 20 includes the log acquirer 201, the statistics information extractor 202, the exclusion condition learner 203, the log analyzer 204, the detection result filter 205, the primary scorer 206, the continuity determiner 207, the secondary scorer 208, and the detection result display unit 209. The log analysis device 20 stores therein the analysis communication log 251, the network statistics information 252, the analysis rule setting information 253, the signature information 254, the detection exclusion condition 255, the primary detection result 256, the continuity information 257, and the secondary detection result 258.

The log acquirer 201 acquires a communication log to be analyzed obtained from communications in a predetermined network. The log acquirer 201 acquires the normalized communication log 103 from the log collection and accumulation device 10 as the communication log to be analyzed. The log acquirer 201, for example, searches for the normalized communication log 103 with predetermined search conditions to make an inquiry about acquisition of a log. The log collection and accumulation device 10 transmits a search result to the log acquirer 201 as a response. In the following description, the normalized communication log is simply referred to as a communication log.

The log acquirer 201 stores the communication log to be analyzed in the log analysis device 20 as the analysis communication log 251. The statistics information extractor 202 extracts statistics information from the communication log to be analyzed acquired by the log acquirer 201. The statistics information extractor 202 extracts the number of times and the ratio of occurrence of the values of the respective fields in a predetermined period of time or the number and the ratio of unique terminals that generate the communication log, for example. The statistics information extractor 202 stores the extracted statistics information in the log analysis device 20 as the network statistics information 252 indicating the characteristics of the network to be analyzed.

The log analyzer 204 detects a terminal conforming to an analysis rule using a signature generated based on the characteristics of a communication log generated by a terminal infected with malware. The log analyzer 204 acquires the analysis communication log 251 for a predetermined period of time, generates analysis rules based on the analysis rule setting information 253 and the signature information 254, and performs an analysis using the generated analysis rules. The analysis rule setting information 253 is a threshold of the analysis rule, for example. The signature information 254 is the field, the value, and the degree of threat of the signature of the analysis rule, for example. The log analyzer 204 is an example of a detector. The degree of threat may be a value set based on the known magnitude of damage caused by malware corresponding to the analysis rule, for example. Alternatively, the degree of threat may be the number of cases of infection with the malware or a value obtained by normalizing the length of duration of an attack made by the malware.

The following describes the analysis rule with reference to FIG. 3. FIG. 3 is a diagram of an example of the analysis rules. If a communication log to be analyzed generated by a predetermined terminal satisfies the detection condition of the analysis rule, the log analyzer 204 detects the terminal. The log analyzer 204, for example, detects a terminal having the number of times a pair of the predetermined field and the value included in the communication log to be analyzed matches the signature of equal to or larger than a threshold set in advance. The analysis rules each have the degree of threat. The degree of threat is used when the primary scorer 206, which will be described later, calculates a score.

As indicated by an analysis rule "Rule-1" in FIG. 3, for example, the log analyzer 204 detects a terminal that generates a communication log having an URL "http://www.malsite.com/" one or more times. The degree of threat of the analysis rule "Rule-1" is "8".

As indicated by an analysis rule "Rule-2" in FIG. 3, for example, the log analyzer 204 detects a terminal that generates a communication log having a protocol+destination port "TCP/4092" ten or more times. The degree of threat of the analysis rule "Rule-2" is "2".

As indicated by an analysis rule "Rule-3" in FIG. 3, for example, the log analyzer 204 detects a terminal that generates a communication log having a destination organization "Malware.com" one or more times. The degree of threat of the analysis rule "Rule-3" is "7". The destination organization can be extracted from the URL information in the communication log.

As indicated by an analysis rule "Rule-4" in FIG. 3, for example, the log analyzer 204 detects a terminal that generates a communication log having a UserAgent "badAgent" five or more times. The degree of threat of the analysis rule "Rule-4" is "3".

As indicated by an analysis rule "Rule-5" in FIG. 3, for example, the log analyzer 204 detects a terminal that generates a communication log having a destination IP address "10.10.10.10" five or more times. The degree of threat of the analysis rule "Rule-5" is "8".

The analysis rule is not necessarily counting the number of times of occurrence of the field and the value as illustrated in FIG. 3. Alternatively, the analysis rule may be used for detection based on how much a terminal matches a predetermined pattern considering a time series, for example. The analysis rule may have a combination of five URLs as a pattern, for example, and may be used for detecting a terminal that accesses four or more URLs out of the five URLs, that is, a terminal having a matching ratio of equal to or higher than 80%.

The following describes the detection results obtained by the log analyzer 204 with reference to FIG. 4. FIG. 4 is a diagram of an example of the detection results. As illustrated in FIG. 4, the detection results each include a detected terminal, an analysis rule, a threshold, a count number, a basic score, and information on a relating log. The count number is the number of times a pair of the field and the value is counted. The basic score is the degree of threat set for the analysis rule. The information on a relating log is information on the communication log to be analyzed used in detection.

The row of No. 1 in FIG. 4, for example, indicates that a terminal "192.168.10.10" is detected based on the analysis rule "Rule-1", that the threshold is "1", that the count number is "1", that the basic score is "8", and that the information on a relating log is "Log1".

The row of No. 2 in FIG. 4, for example, indicates that a terminal "192.168.20.20" is detected based on the analysis rule "Rule-2", that the threshold is "10", that the count number is "20", that the basic score is "2", and that the information on a relating log is "Log101-120".

The row of No. 3 in FIG. 4, for example, indicates that a terminal "192.168.30.30" is detected based on the analysis rule "Rule-3", that the threshold is "1", that the count number is "1", that the basic score is "7", and that the information on a relating log is "Log300".

The row of No. 4 in FIG. 4, for example, indicates that a terminal "192.168.40.40" is detected based on the analysis rule "Rule-1", that the threshold is "1", that the count number is "5", that the basic score is "8", and that the information on a relating log is "Log401-405".

The row of No. 5 in FIG. 4, for example, indicates that a terminal "192.168.50.50" is detected based on the analysis rule "Rule-2", that the threshold is "10", that the count number is "50", that the basic score is "2", and that the information on a relating log is "Log501-550".

The detection result filter 205 excludes a detection result satisfying a predetermined condition out of the detection results obtained by the log analyzer 204. The primary scorer 206 and the secondary scorer 208 calculate the scores for the detection results other than the detection result excluded by the detection result filter 205 out of the detection results obtained by the log analyzer 204. The primary scorer 206 and the secondary scorer 208 are an example of a calculator. The detection result filter 205 is an example of an excluder.

The detection exclusion condition 255 is learned by the exclusion condition learner 203. The exclusion condition learner 203 extracts, as candidates of the detection exclusion condition, a detection condition similar to the registered detection exclusion condition 255, a detection condition having an IP address present in the same IP address range as that of the IP address included in the detection exclusion condition, a value frequently appearing in the network statistics information 252, and a value frequently appearing for a specific destination IP address on the network to be analyzed, for example. The exclusion condition learner 203 evaluates the candidates of the detection exclusion condition using the network statistics information 252, for example. The exclusion condition learner 203 adds, to the detection exclusion condition 255, a candidate of the detection exclusion condition having the detection ratio or the erroneous detection ratio satisfying a predetermined condition.

The primary scorer 206 and the secondary scorer 208 calculate the score indicating the degree of threat for the detection result including the information on the terminal detected by the log analyzer 204 and the analysis rule to which the terminal conforms using the information on the analysis rule and the information on the detection result.

The primary scorer 206 adds a primary score to the detection result obtained by the log analyzer 204. The primary scorer 206 calculates the primary score based on the degree of threat of the signature set in advance and the degree of deviation of the number of times from the threshold.

The following describes the primary detection result 256, which is the detection result to which the primary score is added by the primary scorer 206 with reference to FIG. 5. FIG. 5 is a diagram of an example of the primary detection results. As illustrated in FIG. 5, the primary detection results each include a detected terminal, an analysis rule, a threshold, a count number, a primary score, and an exclusion flag. The exclusion flag indicates the detection result excluded by the detection result filter 205.

The row of No. 1 in FIG. 5, for example, indicates that the terminal "192.168.10.10" is detected based on the analysis rule "Rule-1", that the threshold is "1", that the count number is "1", and that the primary score is "8". The primary scorer 206 calculates the primary score using Expression (1). In Expression (1), "Count Number+Threshold" indicates an example of the degree of deviation of the count number from the threshold. The basic score and the threshold are an example of the information on the analysis rule. The count number is an example of the information on the detection result.

$$\text{Primary Score} = \text{Basic Score} \times (\text{Count Number} + \text{Threshold}) \quad (1)$$

The row of No. 2 in FIG. 5, for example, indicates that the terminal "192.168.20.20" is detected based on the analysis rule "Rule-2", that the threshold is "10", that the count number is "20", and that the primary score is "4". The primary scorer 206 does not calculate the primary score for the detection result in the row of No. 3 because the row of No. 3 in FIG. 5 is flagged with the exclusion flag.

The row of No. 4 in FIG. 5, for example, indicates that the terminal "192.168.40.40" is detected based on the analysis rule "Rule-1", that the threshold is "1", that the count number is "5", and that the primary score is "40". The row of No. 5 in FIG. 5, for example, indicates that the terminal "192.168.50.50" is detected based on the analysis rule "Rule-2", that the threshold is "10", that the count number is "50", and that the primary score is "10".

The continuity determiner 207 determines the continuity of the detection result included in the primary detection result 256. Specifically, the continuity determiner 207 acquires, from the continuity information 257, the same detection as the detection that yields the detection result included in the primary detection result 256, that is, the date and time when the detection based on the same analysis rule is performed on the same terminal for the first time, the number of times the detection is performed in a predetermined period of time, and the like. The continuity determiner 207 calculates a continuity score indicating the continuity. The continuity determiner 207 makes the continuity score larger as the date and time when the detection is performed for the first time is in more distant past and as the number of times the detection is performed in the predetermined period of time is larger. The continuity determiner 207, for example, may perform totalization on the detection results every predetermined period of time and record the number of cases of detection performed based on the same rule on the same terminal in each period of time as the continuity score.

The secondary scorer 208 adds a secondary score to the primary detection result 256. The secondary scorer 208 calculates the secondary score based on the period of time and the frequency of occurrence of a detection result including the information on the same terminal and the same analysis rule as the information on the terminal and the analysis rule included in the detection result and on the primary score. The period of time and the frequency of occurrence of the detection result are calculated by the continuity determiner 207.

The following describes the secondary detection result 258, which is the detection result to which the secondary score is added by the secondary scorer 208 with reference to FIG. 6. FIG. 6 is a diagram of an example of the secondary detection results. As illustrated in FIG. 6, the secondary detection results each include a detected terminal, an analysis rule, a threshold, a count number, a secondary score, and an exclusion flag.

The row of No. 1 in FIG. 6, for example, indicates that the terminal "192.168.10.10" is detected based on the analysis rule "Rule-1", that the threshold is "1", that the count number is "1", and that the secondary score is "58". The secondary scorer 208 calculates the secondary score for the detection result detected based on the terminal analysis rule "Rule-1" using Expression (2). In the example illustrated in FIG. 6, the continuity score of the detection performed on the terminal "192.168.10.10" based on the analysis rule "Rule-1" is "50". The continuity score is an example of the information on the detection result.

$$\text{Secondary Score} = \text{Primary Score} + \text{Continuity Score} \quad (2)$$

The row of No. 2 in FIG. 6, for example, indicates that the terminal "192.168.20.20" is detected based on the analysis rule "Rule-2", that the threshold is "10", that the count number is "20", and that the secondary score is "4". In the example illustrated in FIG. 6, the continuity score of the detection performed on the terminal "192.168.20.20" based on the analysis rule "Rule-2" is "0". The secondary scorer 208 does not calculate the secondary score for the detection result in the row of No. 3 because the row of No. 3 in FIG. 6 is flagged with the exclusion flag.

The row of No. 4 in FIG. 6, for example, indicates that the terminal "192.168.40.40" is detected based on the analysis rule "Rule-1", that the threshold is "1", that the count number is "5", and that the secondary score is "42". In the example illustrated in FIG. 6, the continuity score of the detection performed on the terminal "192.168.40.40" based on the analysis rule "Rule-1" is "2".

The row of No. 5 in FIG. 6, for example, indicates that the terminal "192.168.50.50" is detected based on the analysis rule "Rule-2", that the threshold is "10", that the count number is "50", and that the secondary score is "15". In the example illustrated in FIG. 6, the continuity score of the detection performed on the terminal "192.168.50.50" based on the analysis rule "Rule-2" is "5".

The detection result display unit 209 outputs the detection result and the score calculated by the primary scorer 206 and the secondary scorer 208. The detection result display unit 209 may output at least the information on the terminal included in the detection result and the secondary score. The detection result display unit 209 is an example of an output unit.

Figure 7:
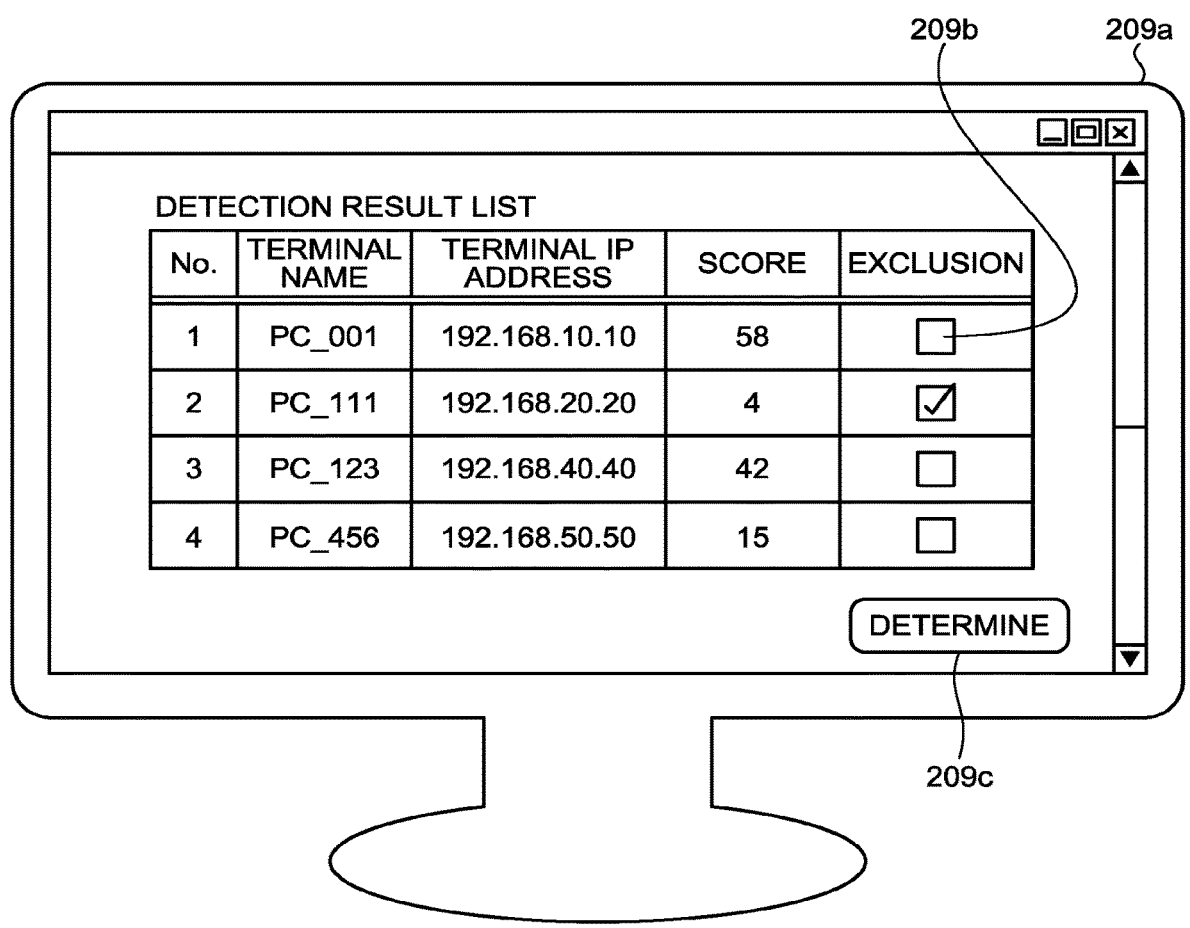
FIG. 7 is a diagram of an example of a detection result display screen.

The detection result display unit 209 displays the secondary detection result 258. As illustrated in FIG. 7, for example, the detection result display unit 209 displays the secondary detection result 258 on a detection result display screen 209a in a form browsable by an operator 30. FIG. 7 is a diagram of an example of the detection result display screen.

As illustrated in FIG. 7, the detection result display unit 209 displays terminal names and terminal IP addresses of the terminals included in the secondary detection result 258 on the detection result display screen 209a. The detection result display unit 209 may refer to a predetermined DB that manages the terminals, which is not illustrated, and acquire the terminal names based on the terminal IP addresses. The detection result display unit 209 displays the secondary scores included in the secondary detection result 258 as scores and also displays exclusion check boxes 209b and a determination button 209c. The detection result display unit 209 may acquire and display the information on the communication log from the analysis communication log 251 as analysis additional information.

The operator 30 checks the exclusion check box 209b of a detection result determined to be excluded from future detection in a list of detection results displayed on the detection result display screen 209a and presses the determination button 209c. A feedback unit 210 registers the detection result the exclusion check box 209b of which is checked in the detection exclusion condition 255. The exclusion condition learner 203 defines the detection result as an exclusion condition or a candidate of the exclusion condition.

As described above, the detection result display unit 209 receives selection indicating whether the detection result need not be dealt with. The detection result filter 205 excludes the detection result in at least one of a case where the frequency of occurrence in the network of a communication log having the same characteristics as those of the signature used by the analysis rule included in the detection result is equal to or higher than a predetermined value and a case where the determination that the detection result need not be dealt with is received in advance by the detection result display unit 209. At this time, the detection result display unit 209 serves as a receiver. The detection result filter 205 may perform processing of making the detection result determined to be an exclusion condition or a candidate of the exclusion condition less likely to be subjected to the same detection by the log analyzer 204. The detection result filter 205, for example, may notify the log analyzer 204 of the detection result determined to be an exclusion condition or a candidate of the exclusion condition. In this case, the log analyzer 204 may exclude the analysis rule corresponding to the received detection result from the objects to be analyzed or increase the threshold of the analysis rule.

In the example illustrated in FIG. 7, the detection result display unit 209 displays that the terminal having a terminal name "PC_001" and a terminal IP address "192.168.10.10" is detected and that the score of detection is "58". The detection result display unit 209 displays that the terminal having a terminal name "PC_111" and a terminal IP address "192.168.20.20" is detected, that the score of detection is "4", and that the exclusion check box 209b is checked. The detection result display unit 209 displays that the terminal having a terminal name "PC_123" and a terminal IP address "192.168.40.40" is detected and that the score of detection is "42". The detection result display unit 209 displays that the terminal having a terminal name "PC_456" and a terminal IP address "192.168.50.50" is detected and that the score of detection is "15".

Processing According to the First Embodiment

The following describes processing performed by the log analysis device 20 with reference to FIG. 8. FIG. 8 is a flowchart of a processing procedure performed by the log analysis device according to the first embodiment. As illustrated in FIG. 8, the log acquirer 201 acquires a communication log to be analyzed (Step S11). Subsequently, the log analyzer 204 detects a terminal conforming to an analysis rule based on the communication log to be analyzed (Step S12).

The detection result filter 205 excludes a detection result satisfying a detection exclusion condition out of the detection results obtained by the log analyzer 204 (Step S13). The detection exclusion condition is generated by the exclusion condition learner 203 learning the network statistics information 252 extracted from the communication log by the statistics information extractor 202.

The primary scorer 206 calculates a primary score based on the analysis rule and the detection result and adds the calculated primary score to the detection result to generate the primary detection result 256 (Step S14).

The secondary scorer 208 calculates a secondary score based on the primary score and the continuity of detection and adds the calculated secondary score to the primary detection result 256 to generate the secondary detection result 258 (Step S15). The detection result display unit 209 displays and outputs the detection result and the score included in the secondary detection result 258 on a screen (Step S16).

The feedback unit 210 gives feedback of a detection result determined to be excluded from detection by the operator 30 out of the detection results displayed by the detection result display unit 209 to the detection exclusion condition 255.

Advantageous Effects of the First Embodiment

The log acquirer 201 acquires a communication log to be analyzed obtained from communications in a predetermined network. The log analyzer 204 detects a terminal conforming to an analysis rule using a signature generated based on the characteristics of a communication log generated by a terminal infected with malware. The primary scorer 206 and the secondary scorer 208 calculate a score indicating the degree of threat for a detection result including the information on the terminal detected by the log analyzer 204 and an analysis rule to which the terminal conforms using the information on the analysis rule and the information on the detection result. The detection result display unit 209 outputs the detection result and the score calculated by the primary scorer 206 and the secondary scorer 208.

If a plurality of detection results are present, the operator can check the scores added to the respective detection results. As a result, the operator can readily determine the detection result to be preferentially dealt with. The operator, for example, determine the detection result having the largest score as the detection result to be preferentially dealt with out of the detection results yet to be dealt with.

The log analyzer 204 may detect a terminal having the number of times a pair of a predetermined field and a value included in the communication log to be analyzed matches the signature of equal to or larger than a threshold set in advance. The primary scorer 206 calculates the primary score based on the degree of threat of the signature set in advance and the degree of deviation of the number of times from the threshold.

Consequently, the score can reflect the number of times the communication log matches the signature. A terminal having a larger number of times the communication log matches the signature, for example, is assumed to actually perform a large number of malicious communications caused by malware. By reflecting the number of times the communication log matches the signature, the operator can make a determination to preferentially deal with the terminal performing a large number of malicious communications.

The secondary scorer 208 may calculate the secondary score based on the period of time and the frequency of occurrence of a detection result including the information on the same terminal and the same analysis rule as the information on the terminal and the analysis rule included in the detection result and on the primary score. The detection result display unit 209 outputs at least the information on the terminal included in the detection result and the secondary score.

Consequently, the score can reflect the continuity of the detection result. Let us assume a case where a detection result is detected based on a signature having a small degree of threat, for example. If the same detection is performed on the same terminal for a long period of time or with high frequency, the operator can make a determination to preferentially deal with the detection result.

The detection result filter 205 may exclude a detection result satisfying a predetermined condition out of the detection results obtained by the log analyzer 204. The primary scorer 206 and the secondary scorer 208 calculate the scores for the detection results other than the detection result excluded by the detection result filter 205 out of the detection results obtained by the log analyzer 204.

As described above, the detection result is excluded based on the predetermined exclusion condition set in advance. Consequently, the processing load in the primary scoring and the secondary scoring and the load required for the operator to determine the priority of the detection results can be reduced.

The detection result display unit 209 may receive selection indicating whether the detection result need not be dealt with. The detection result filter 205 excludes the detection result in at least one of a case where the frequency of occurrence in the network of a communication log having the same characteristics as those of the signature used by the analysis rule included in the detection result is equal to or higher than a predetermined value and a case where the determination that the detection result need not be dealt with is received in advance by the detection result display unit 209.

Consequently, a detection result determined to be excluded by the operator can be excluded and the load required for the operator to determine the priority of the detection results can be reduced. Furthermore, a detection result of a communication log having the characteristics common in the network is excluded, thereby erroneous detection is reduced.

System Configuration and the Like

The components of the devices illustrated in the drawings are functionally conceptual and are not necessarily physically configured as illustrated in the drawings. In other words, the specific aspects of distribution and integration of the devices are not limited to those illustrated in the drawings. All or part of the components may be distributed or integrated functionally or physically in desired units depending on various kinds of loads and states of use, for example. All or desired part of the processing functions performed by the devices are provided by a CPU or a program analyzed and executed by the CPU or as hardware by wired logic.

All or part of the processing described as automatically performed processing out of the processing described in the present embodiment may be performed manually. Alternatively, all or part of the processing described as manually performed processing may be performed automatically by a known method. In addition, the processing procedures, the control procedures, the specific names, and the information including various kinds of data and parameters described in the present specification and the drawings can be optionally changed unless there is any special mention.

Programs

The log analysis device 20 according to an embodiment can be provided by installing, in a desired computer, a log analysis program that performs the log analysis described above as packaged or online software. An information processing device executes the log analysis program, for example, thereby serving as the log analysis device 20. Examples of the information processing device may include, but are not limited to, desktop or notebook personal computers, etc. Examples of the information processing device may also include, but are not limited to, mobile communication terminals, such as smartphones, mobile phones, and PHS (personal handy-phone system), slate terminals, such as PDA (personal digital assistants), etc.

A terminal device used by a user may be defined as a client, and the log analysis device 20 may be provided as a log analysis server device that provides services relating to the log analysis to the client. The log analysis server device, for example, is provided as a server device that provides log analysis services of receiving the communication log to be analyzed and outputting the information on the detected terminal and the secondary score. In this case, the log analysis server device may be provided as a web server or a cloud that provides services relating to the log analysis by outsourcing.

FIG. 9 is a diagram of an example of a computer serving as the log analysis device by executing the program. A computer 1000 includes a memory 1010 and a CPU 1020. The computer 1000 also includes a hard disk drive interface 1030, a disk drive interface 1040, a serial port interface 1050, a video adapter 1060, and a network interface 1070, for example. These components are coupled via a bus 1080.

The memory 1010 includes a ROM (read only memory) 1011 and a RAM 1012. The ROM 1011 stores therein a boot program, such as a BIOS (basic input/output system). The hard disk drive interface 1030 is coupled to a hard disk drive 1090. The disk drive interface 1040 is coupled to a disk drive 1100. Detachable storage media, such as magnetic disks and optical discs, are inserted into the disk drive 1100. The serial port interface 1050 is coupled to a mouse 1110 and a keyboard 1120, for example. The video adapter 1060 is coupled to a display 1130, for example.

The hard disk drive 1090 stores therein an OS 1091, an application program 1092, a program module 1093, and program data 1094, for example. In other words, the program defining the processing performed by the log analysis device 20 is provided as the program module 1093 describing computer-executable codes. The program module 1093 is stored in the hard disk drive 1090, for example. The program module 1093 that executes the same processing as that performed by the functional configuration in the log analysis device 20, for example, is stored in the hard disk drive 1090. Instead of the hard disk drive 1090, an SSD may be provided.

The setting data used for the processing according to the present embodiment is stored in the memory 1010 or the hard disk drive 1090 as the program data 1094, for example. The CPU 1020 reads and executes the program module 1093 and the program data 1094 stored in the memory 1010 or the hard disk drive 1090 in the RAM 1012 as needed.

The program module 1093 and the program data 1094 are not necessarily stored in the hard disk drive 1090. The program module 1093 and the program data 1094 may be stored in a detachable storage medium and read by the CPU 1020 via the disk drive 1100, for example. Alternatively, the program module 1093 and the program data 1094 may be stored in a second computer coupled via a network (e.g., a LAN or a WAN (wide area network)). In this case, the program module 1093 and the program data 1094 may be read from the second computer by the CPU 1020 via the network interface 1070.

REFERENCE SIGNS LIST

1 log analysis system
10 log collection and accumulation device
20 log analysis device
30 operator
101 collector
102 normalizer
103 normalized communication log
201 log acquirer
202 statistics information extractor
203 exclusion condition learner
204 log analyzer
205 detection result filter
206 primary scorer
207 continuity determiner
208 secondary scorer
209 detection result display unit
251 analysis communication log
252 network statistics information
253 analysis rule setting information
254 signature information
255 detection exclusion condition
256 primary detection result
257 continuity information
258 secondary detection result

The invention claimed is:

1. A log analysis device comprising:
a memory; and a processor coupled to the memory and programmed to execute a process comprising:
acquiring a communication log to be analyzed obtained from communications in a predetermined network;
detecting a terminal conforming to an analysis rule using a signature generated based on a characteristic of a communication log generated by a terminal infected with malware;
calculating a score indicating a degree of threat for a detection result including information on the terminal detected by the detecting and an analysis rule to which the terminal conforms using information on the analysis rule and information on the detection result; and
outputting the detection result and the score calculated by the calculating,
wherein the calculating includes calculating a continuity score indicating continuity of the detection result by making the continuity score larger as date and time when the detection is performed for a first time is in more distant past and as a number of times the detection is performed in a predetermined period of time is larger.

2. The log analysis device according to claim 1, wherein the detecting detects a terminal having number of times a pair of a predetermined field and a value included in the communication log to be analyzed matches the signature of equal to or larger than a threshold set in advance, and
the calculating calculates the score based on the degree of threat of the signature set in advance and a degree of deviation of the number of times from the threshold.

3. The log analysis device according to claim 1, wherein the calculating calculates the score based on a period of time and a frequency of occurrence of a detection result including information on the same terminal and the same analysis rule as the information on the terminal and the analysis rule included in the detection result.

4. The log analysis device according to claim 1, wherein the detecting detects a terminal having number of times a pair of a predetermined field and a value included in the communication log to be analyzed matches the signature of equal to or larger than a threshold set in advance,
the calculating calculates a first score based on the degree of threat of the signature set in advance and a degree of deviation of the number of times from the threshold and calculates a second score based on a period of time and a frequency of occurrence of a detection result including information on the same terminal and the same analysis rule as the information on the terminal and the analysis rule included in the detection result and on the first score, and
the outputting outputs at least the information on the terminal included in the detection result and the second score.

5. The log analysis device according to claim 1, wherein the process further comprising:
excluding a first detection result satisfying a predetermined condition out of a plurality of the detection results obtained by the detecting, wherein
the calculating calculates the score for a second detection result other than the first detection result excluded by the excluding out of the detection results obtained by the detecting.

6. The log analysis device according to claim 5, wherein the process further comprising:
receiving selection indicating whether the detection result need not be dealt with, wherein
the excluding excludes the detection result in at least one of a case where a frequency of occurrence in the network of a communication log having the same characteristic as a characteristic of the signature used by the analysis rule included in the detection result is equal to or higher than a predetermined value and a case where the determination that the detection result need not be dealt with is received in advance by the receiving.

7. A log analysis method performed by a log analysis device, the log analysis method comprising:
acquiring a communication log to be analyzed obtained from communications in a predetermined network;

detecting a terminal conforming to an analysis rule using a signature generated based on a characteristic of a communication log generated by a terminal infected with malware;

calculating a score indicating a degree of threat for a detection result including information on the terminal detected at the detecting and an analysis rule to which the terminal conforms using information on the analysis rule and information on the detection result; and outputting the detection result and the score calculated at the calculating, wherein the calculating includes calculating a continuity score indicating continuity of the detection result by making the continuity score larger as date and time when the detection is performed for a first time is in more distant past and as a number of times the detection is performed in a predetermined period of time is larger.

8. A non-transitory computer-readable recording medium having stored a program for log analysis program that causes a computer to execute a process comprising:

acquiring a communication log to be analyzed obtained from communications in a predetermined network;

detecting a terminal conforming to an analysis rule using a signature generated based on a characteristic of a communication log generated by a terminal infected with malware;

calculating a score indicating a degree of threat for a detection result including information on the terminal detected by the detecting and an analysis rule to which the terminal conforms using information on the analysis rule and information on the detection result; and outputting the detection result and the score calculated by the calculating, wherein the calculating includes calculating a continuity score indicating continuity of the detection result by making the continuity score larger as date and time when the detection is performed for a first time is in more distant past and as a number of times the detection is performed in a predetermined period of time is larger.

\* \* \* \* \*